Patented Aug. 26, 1952

2,608,559

UNITED STATES PATENT OFFICE 2,608,559

TERTIARY-AMINO-1-ARYL-1-(4-QUINOLYL) ALKANES AND PREPARATION THEREOF

Alexander R. Surrey, Albany, and Royal A. Cutler, Troy, N. Y., assignors to Sterling Drug Inc., Wilmington, Del., a corporation of Delaware No Drawing. Original application May 28, 1948, Serial No. 29,936. Divided and this application November 18, 1950, Serial No. 196,522

20 Claims. (Cl. 260—286)

This invention relates to quinoline compounds and to processes of preparing the same.

More particularly, this invention relates to basic alpha-aryl-alpha - (4 - quinolyl) alkanenitriles, to derivatives thereof, to addition salts of said compounds, and to processes of preparing the hereinbefore named compounds.

Our invention comprehends compounds of the formula

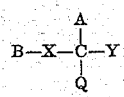

where B is a lower aliphatic tertiary-amino radical; X is a lower alkylene radical; Y is a member of the group consisting of CN, CONH₂, and H; A is an aryl radical; and Q is a 4-quinolyl radical. These compounds are of interest as pharmaceutical agents and as intermediates in preparing pharmaceutical agents.

In the above formula, the lower aliphatic tertiary-amino radical, designated as B, comprehends lower dialkylamino radicals illustrated by examples such as dimethylamino, diethylamino, ethylmethylamino, di-n-butylamino, and the like; and lower saturated N-heterocyclic radicals illustrated by examples such as 1-piperidyl, 4-morpholinyl, 3-methyl-1-piperidyl, 2-methyl-1-pyrrolidyl, 2,6-dimethyl-1-piperidyl, and the like. In other words, BH designates a lower aliphatic secondary-amine as illustrated by diethylamine, di-n-butylamine, morpholine, 3-ethylpiperidine, and the like. The lower alkylene radical, designated as X, includes radicals such as —CH₂CH₂—,

—CH₂CH₂CH₂—, —CH₂CH₂CH₂CH₂—

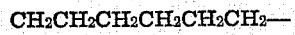

and the like. X further includes alkylene radicals interrupted by elements such as oxygen and sulfur, e. g. —CH₂CH₂OCH₂CH₂—,

—CH₂CH₂CH₂SCH₂CH₂—

Thus, the expression " a lower aliphatic tertiary-aminoalkyl radical" when used hereafter in the specification or in the appended claims, comprehends those groups designated as B—X—, where B and X have the meanings hereinabove described. The aryl radical, designated as A, is one of preferably 6–10 carbon atoms. The aryl radical can be substituted by such groups as hydroxyl; alkoxyl such as methoxyl, ethoxyl, etc.; dialkylamino such as dimethylamino; halogen such as chloro, bromo, or iodo; lower alkyl such as methyl, ethyl, butyl, etc.; and other groups which the chemist appreciates will be unaffected by the reaction conditions used in the preparation of the basic compounds of our invention.

It is to be understood that the term "a 4-quinolyl radical" (designated as Q) as used in this specification and in the appended claims is generic, and includes 4-quinolyl radicals wherein the quinoline nucleus may be substituted by one or more of such groups as: halo, including chloro, bromo, iodo, and fluoro; lower alkyl, including methyl, ethyl, propyl, amyl, and the like; hydroxy; lower alkoxy, including methoxy, ethoxy, propoxy, and the like; aryloxy, such as phenoxy; aralkoxy, such as benzyloxy; trihaloalkyl, such as trifluoromethyl; nitro; amino, substituted-amino, such as acetylamino, ethylamino, dimethylamino, benzylamino, and the like; and other substituents.

As illustrative of our invention the following specific compounds are presented:

(1) 6 - diethylamino-2-(4-methoxyphenyl) -2- (6-methoxy-4-quinolyl) -hexanenitrile,

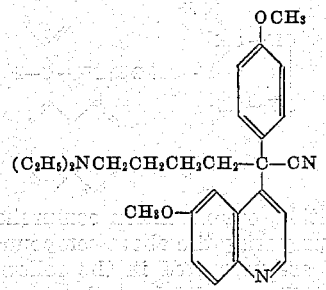

(2) 4-dimethylamino - 2 - (3-methylphenyl) - 2-(3-methyl-8-ethoxy-4-quinolyl) pentanenitrile,

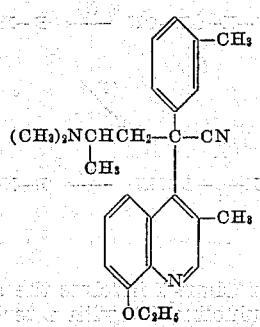

(3) 5-(1-piperidyl)-2-phenyl-2-(3-bromo-7-chloro-4-quinolyl)-pentanamide,

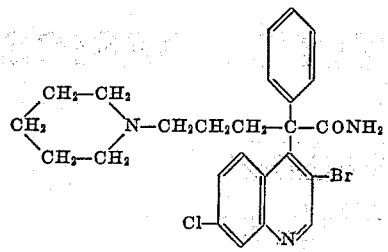

(4) 4-(di-n-butylamino)-2-(3,4-dichlorophenyl)-2-(3-nitro-7-chloro-4-quinolyl)butanamide,

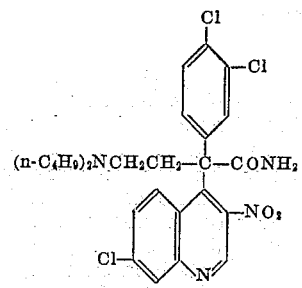

(5) 3-(4-morpholinyl)-1-phenyl-1-(3,6,7-trimethyl-4-quinolyl)-propane.

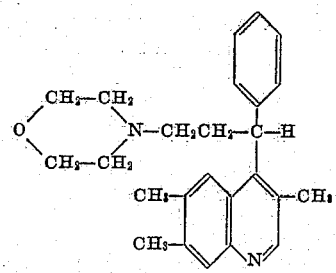

(6) 4-(2-methyl-1-pyrrolidyl)-1-phenyl-1-(7-phenoxy-4-quinolyl)-butane,

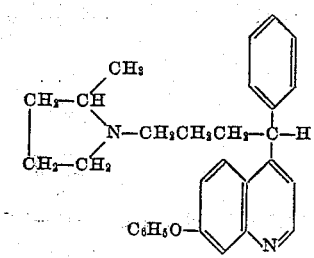

In addition, our invention comprehends processes for preparing the above compounds. These processes are presented in the following chart, wherein B, X, A, and Q have the meanings hereinabove specified, and Z stands for halogen:

Chart I

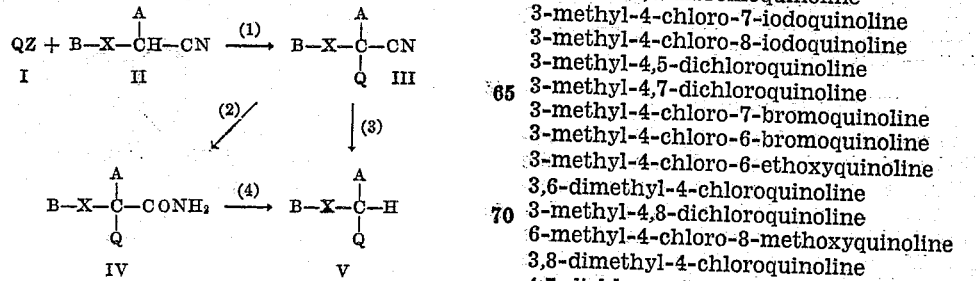

Step (1) of Chart I involves the condensation of a 4-haloquinoline (I) with a tertiary-amino-2-arylalkanenitrile (II) in the presence of a strong base to yield a basic nitrile (III). For example, 4-diethylamino-2-phenyl-2-(7-chloro-4-quinolyl)butanenitrile is prepared by condensing 4,7-dichloroquinoline with 4-diethylamino-2-phenylbutanenitrile in the presence of sodium amide. Other basic condensing agents, e. g. potassium amide, sodium hydride, phenyllithium, and the like, can be used in place of sodium amide.

The intermediate tertiary-amino-2-arylalkanenitriles (II) are a generally known group of compounds, which are prepared by condensing in the presence of a basic agent, such as sodium amide, a lower aliphatic tertiary-aminoalkyl halide, B—X—halogen, with an arylacetonitrile, $ACH_2CN$, where B, X, and A have the meanings hereinabove specified. For example, the preparation of 4-diethylamino-2-phenylbutanenitrile from 2-diethylaminoethyl chloride and phenylacetonitrile is described by Eisleb, Ber. 74, 1441 (1941). Other examples are afforded by Kwartler and Lucas (J. A. C. S. 68, 2395 (1946)) who describe the preparations of: 4-diethylamino-2-(4-chlorophenyl)butanenitrile from 2-diethylaminoethyl chloride and 4-chlorophenylacetonitrile; 4-diethylamino-2-(3,4-dichlorophenyl)butanenitrile from 2-diethylaminoethyl chloride and 3,4-dichlorophenylacetonitrile; 4-diethylamino-2-(4-methoxyphenyl)butanenitrile from 2-diethylaminoethyl chloride and 4-methoxyphenylacetonitrile; 4-dimethylamino-2-phenylbutanenitrile from 2-dimethylaminoethyl chloride and phenylacetonitrile; and 5-diethylamino-2-(4-chlorophenyl)-pentanenitrile from 3-diethylaminopropyl chloride and 4-chlorophenylacetonitrile.

The intermediate 4-haloquinolines (1) also are generally well known to those versed in the art; for representative literature references see: Surrey et al., J. Am. Chem. Soc. 68, 113, 1244, and 2570 (1946); Steck et al.; ibid. 129, 132, 380, and 1241 (1946); Riegel et al., ibid. 1229; Baker et al.; ibid. 1267; Mosher et al., ibid. 69, 303 (1947); Bachman et al., ibid. 365; Snyder et al., ibid. 371; and Clinton et al., ibid. 704. Some 4-haloquinolines that are useful intermediates in the preparation of the compounds of our invention are listed as follows:

3,4-dichloroquinoline
3,4,5-trichloroquinoline
3,4,7-trichloroquinoline
3-bromo-4-chloroquinoline
3-bromo-4,7-dichloroquinoline
3-iodo-4-chloroquinoline
3-iodo-4-chloroquinoline
3-iodo-4,5-dichloroquinoline
4,5,6-trichloroquinoline
4,5,7-trichloroquinoline
4,6,8-trichloroquinoline
4,7,8-trichloroquinoline
4-chloro-5,7-dibromoquinoline
3-methyl-4-chloro-7-iodoquinoline
3-methyl-4-chloro-8-iodoquinoline
3-methyl-4,5-dichloroquinoline
3-methyl-4,7-dichloroquinoline
3-methyl-4-chloro-7-bromoquinoline
3-methyl-4-chloro-6-bromoquinoline
3-methyl-4-chloro-6-ethoxyquinoline
3,6-dimethyl-4-chloroquinoline
3-methyl-4,8-dichloroquinoline
6-methyl-4-chloro-8-methoxyquinoline
3,8-dimethyl-4-chloroquinoline
4,7-dichloroquinoline
4-chloro-7-bromoquinoline
4-chloro-7-iodoquinoline 4,7-dichloro-6-methoxyquinoline
4,5-dichloroquinoline
3-nitro-4-chloroquinoline
3-amino-4-chloroquinoline
4-chloro-7-fluoroquinoline
4-chloro-7-trifluoromethylquinoline
4,7-dichloro-5-methoxyquinoline
4-chloro-7-phenoxyquinoline
3,4-dibromoquinoline
4-chloro-6-nitroquinoline Step (2) of Chart I can be carried out by various methods. In our hands the best results are obtained when a concentrated sulfuric acid solution of the basic nitrile, III, is allowed to stand at room temperature for an extended period. Thus, yields of 90% or better of 4-diethylamino-2-phenyl-2-(7-chloro-4-quinolyl)butanamide are obtained by allowing the sulfuric acid solution of the corresponding nitrile to stand at room temperature for about five weeks. The hydrolysis of the nitrile to the amide, step (2), also can be performed, but in lower yields, by refluxing the appropriate nitrile with sodium hydroxide in aqueous ethanol (about 70%) for about twelve hours or with aqueous sulfuric acid (about 60%) for one hour.

Step (3) of Chart I, the complete hydrolysis of the nitrile group to the carboxyl group which spontaneously loses carbon dioxide, is effected by refluxing an aqeuous sulfuric acid (about 60%) solution of the nitrile, III, for twelve hours or longer to give practically quantitative yields of the basic quinoline derivative designated as V in Chart I. For example, in such a manner 3-diethylamino-1-phenyl-1-(7-chloro-4-quinolyl)propane is prepared from 4-diethylamino-2-phenyl-2-(7-chloro-4 - quinolyl)butanenitrile.

Step (4) of Chart I, the conversion of the carboxamides designated as IV to the related basic quinoline derivatives designated as V is effected in the same manner that step (3) is carried out. Thus, as a specific example, 3-diethylamino-1-phenyl-1-(7-chloro-4-quinolyl) - propane is prepared from 4-diethylamino-2-phenyl-2-(7-chloro-4-quinolyl)butanamide.

Our invention comprehends, not only the basic quinoline derivatives (III, IV and V of Chart I) already described and processes of preparing the same, but also their salts with non-toxic inorganic or organic acids and with esters of strong inorganic acids and organic sulfonic acids. Among the acids which may be employed to form the salts are hydrochloric acid, phosphoric acid, sulfuric acid, sulfamic acid, tartaric acid, citric acid, benzoic acid and the like; and among the esters of strong inorganic acids and organic sulfonic acids are those such as methyl iodide, ethyl bromide, n-propyl bromide, methyl sulfate, benzyl chloride, methyl para-toluenesulfonate, and the like.

The following examples will illustrate specific embodiments of the invention.

EXAMPLES

I. *Tertiary-amino-2-arylalkanenitriles*

The intermediate tertiary-amino-2-arylalkanenitriles, designated as II in Chart I above, are prepared in excellent yield by condensing a lower aliphatic tertiary-aminoalkyl halide with an arylacetonitrile, employing Eisleb's procedure (Ber. 74, 1441 (1941)) with slight modifications. Illustrative of this method is the following condensation of 3-dimethylamino-2-propyl chloride with phenylacetonitrile to yield 4-dimethylamino-2-phenylpentanenitrile and an isomer thereof:

Sodamide (65 g.) is added to a well stirred, ice-cooled solution of 200 g. (1.7 mole) of phenylacetonitrile in 500 ml. of dry benzene. The temperature rises to about 40° C. as the sodium salt forms. After stirring for one hour, 180 g. (1.2 mole) of 3-dimethylamino-2-propyl chloride is added at a rate sufficient to keep the temperature at 30–35° C. while employing strong external cooling. Stirring is continued for four hours and then water added cautiously. The basic products are extracted from the benzene layer with 2 N hydrochloric acid, liberated with sodium hydroxide solution, and extracted with ether. After drying the ether solution over anhydrous calcium sulfate, the ether is removed by distillation and the remaining material is distilled in vacuo, the main fraction, a colorless oil, distilling at 109–111° C. at 0.8 mm., $n_D^{25}=1.5046$. This oil (89%) is a mixture of 4-dimethylamino-2-phenylpentanenitrile and 4-dimethylamino-3-methyl-2-phenylbutanenitrile. The mixture is used as such in subsequent condensations with 4-haloquinolines.

When 2-diethylaminoethyl chloride or 2-dimethylaminoethyl chloride is substituted for 3-dimethylamino-2-propyl chloride in the foregoing process, about 90% yields of 4-diethylamino-2-phenylbutanenitrile, B. P. 123° C. at 0.7 mm., $n_D^{25}=1.5008$, and 4-dimethylamino-2-phenylbutanenitrile, B. P. 104–106° C. at 0.5 mm., $n_D^{25}=1.5055$ are respectively obtained. Other tertiary-aminoalkyl chlorides that are useful in the above procedure include the following: 4-dimethylaminobutyl chloride, 2 - di - n-butylaminoethyl chloride, 3-(1-piperidyl)propyl chloride, 2-(4-morpholinyl)ethyl chloride, 2-(2-methyl-1-piperidyl)ethyl chloride, 3-(1-pyrrolidyl)propyl chloride, 2-(2,6-dimethyl-1-piperidyl)ethyl chloride, 3-(3-methyl-1-piperidyl)propyl chloride, and the like. When used in the above manner these lower aliphatic tertiary-aminoalkyl chlorides result in formation of the corresponding tertiary-amino-2-phenylalkanenitriles.

When the foregoing procedure is carried out using, in place of phenylacetonitrile, a substituted-phenylacetonitrile, the corresponding tertiary - amino - 2 - (substituted - phenyl) acetonitrile results. For example, the condensation of 4 - chlorophenylacetonitrile, 3,4 - dichlorophenylacetonitrile, or 4 - methoxyphenylacetonitrile with 2-diethylaminoethyl chloride results in the formation of the corresponding 4-diethylamino - 2 - (substituted - phenyl) - butanenitriles (see Kwartler and Lucas, J. A. C. S. 68, 2395 (1946), who describe these intermediate nitriles as well as 5-diethylamino-2-(4-chlorophenyl)pentanenitrile which also can be used as an intermediate in our invention).

II. *Tertiary-amino-2-aryl-2-(4-quinolyl)alkanenitriles*

These basic nitriles are prepared by condensing a 4-haloquinoline with a tertiary-amino-2-arylalkanenitrile as described in section I in the presence of a strong base. In practicing our invention, we prefer to use, as the strong base, sodium amide, which is readily available, low costing, and easy to handle. However, other strong bases, such as potassium amide, sodium hydride, phenyl lithium, and the like are usable in this process. The following general procedure gives excellent results:

To a dry benzene (750 ml.) solution of the 4-haloquinoline (0.5 mole) and a tertiary-amino-2-arylalkanenitrile (0.5 mole) in a 2-liter, 3-necked flask fitted with a stirrer, thermometer, and drying tube is added 28 g. of fresh, powdered sodium amide. External cooling is applied when necessary to keep the temperature of the reaction mixture below 45° C. At the end of about two to three hours, the temperature drops to room temperature and stirring is continued for an additional four to five hours. Water is added cautiously, the mixture shaken vigorously, and the benzene layer separated, washed with water, dried over anhydrous calcium sulfate and filtered with decolorizing charcoal. Removal of the benzene by distillation leaves a practically quantitative yield of the basic product. Where the bases are obtained as viscous oils, crystallization is induced by stirring the oil with a little ether. Recrystallization from petroleum ether yields pure samples of the tertiary - amino - 2 - aryl-2-(4-quinolyl)-alkanenitriles as white crystalline solids.

It is important, in the above reaction, that the sodium amide be reasonably fresh. When sodium amide that had been stored for long periods of time (about six months) is used, the reaction fails to go to completion even after twenty-four hours.

In order to remove any unreacted starting materials, a modification of the above procedure is employed. The benzene layer, after washing with water, is extracted with 3 N hydrochloric acid and the combined acid extracts are made just neutral to litmus with dilute sodium hydroxide solution. After extraction with ether to remove any unchanged 4-haloquinoline, the neutral solution is treated with excess sodium hydroxide solution and the product is taken up in chloroform. Removal of the chloroform gives the crude base which is worked up as above.

The mono-hydrochlorides of these tertiary-amino - 2 - aryl - 2 - (4 - quinolyl) - alkanentriles are prepared by dissolving the base in three to four volumes of warm isopropanol and adding slightly less than the calculated amount of ethanolic hydrogen chloride. In some instances ether is added to turbidity and the solution scratched to induce crystallization. The hydrochlorides are dried at 120° in vacuo.

Some basic nitriles prepared in the above manner are those having the formula

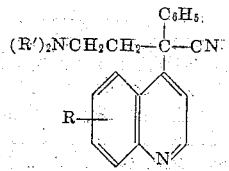

and having the melting points given in Table I:

Table I

| R | R' | M. P. Base °C. (corr.) | M. P. Hydrochloride °C. (corr.) |
|---|----|------|------|
| H | CH₃ | 72–74 | 232.8–233.8 |
| 5-Cl | CH₃ | 115.5–116 | 274.8–276.4 |
| 7-Cl | CH₃ | 105.8–107.4 | 264.4–266 |
| H | C₂H₅ | 73.8–75 [1] | 216–217 |
| 5-Cl | C₂H₅ | 123.2–124.8 | 243.5–245 |
| 7-Cl | C₂H₅ | 91.8–93.4 | 218.2–218.6 |

[1] Appears to exist in two crystalline modifications. When first isolated it melted at 93–104° C.

When the foregoing procedure is employed using as the reactants 4-diethylamino-2-(4-chloro-phenyl)butanenitrile and 4,7-dichloroquinoline, the resulting product is 4-diethylamino-2-(4-chlorophenyl) - 2 - (7 - chloro - 4 - quinolyl)-butanenitrile, M. P. 108.9–110.6° (corr.).

Strong basic condensing agents other than sodium amide can be used to prepare the tertiary-amino-2-aryl-2-(4-quinolyl)alkanenitriles of our invention. For example, we found phenyllithium and sodium hydride to be effective, however, the resultant yields of desired basic nitrile are considerably less than when sodium amide is used. Examples using these two condensing agents follow:

Phenyllithium is prepared under nitrogen by the action of 1.53 g. (0.22 mole) of lithium metal on 11.3 g. (0.1 mole) of chlorobenzene in ether, according to standard procedures (Gilman et al., J. A. C. S. 55, 1252 (1933) and "Method for Preparation of Organo Lithium Compounds," pamphlet, CX–SE Form 10, Lithaloys Corp., 444 Madison Ave., New York 22, N. Y.). However, it is to be noted that there is a considerable amount of lithium which fails to react because of a black coating that forms on the surface of the metal. After removal of the unreacted lithium with tweezers, a solution of 21 g. (0.1 mole) of 4-diethylamino-2-phenylbutanenitrile in 50 ml. of ether is added, there being a heat of reaction that causes the ether to reflux. The resulting solution is then stirred for five minutes, and 19.8 g. (0.1 mole) of 4,7-dichloroquinoline added. The bright red mixture is refluxed for one and one-half hours, and then worked up, according to the above general procedure using sodium amide as the condensing agent, to give a 27% yield of very pure product, 4-diethylamino-2-phenyl-2-(7-chloro-4-quinolyl)butanenitrile. Twelve grams of 4,7-dichloroquinoline is recovered unchanged, which is probably due to the low conversion of lithium to phenyllithium.

Equimolecular amounts of 4-diethylamino-2-phenylbutanenitrile, 4,7-dichloroquinoline, and a slight excess of sodium hydride in dry benzene are refluxed for sixteen hours. After working up according to the previously described procedure using sodium amide as the condensing agent, a 27% yield of 4-diethylamino-2-phenyl-2-(7-chloro-4-quinolyl)butanenitrile is obtained. Note that the sodium hydride used in this run was the last of a bottle which had stood for some time. Possible deterioration of the sodium hydride may account for the low yield.

In addition, the following tertiary-amino-2-aryl-2-(4-quinolyl)-alkanenitriles are formed using the above general procedure by condensing the appropriate tertiary-amino-2-arylalkanenitrile with the appropriate 4-haloquinoline: 4-diethylamino-2 - (4 - methoxyphenyl) - 2 - (6-methoxy - 4 - quinolyl)butanenitrile, 5 - diethylamino - 2 - (4 - chlorophenyl) - 2 - (6,8-dichloro-4-quinolyl)pentanenitrile, 4-(4-morpholinyl) - 2 - (3,4 - dichlorophenyl) - 2 - (3 - nitro-4-quinolyl)butanenitrile, and 4-(2-methyl-1-piperidyl) - 2 - phenyl - 2 - (3 - methyl - 7-iodo-4-quinolyl)butanenitrile.

When the above procedure is carried out using for the tertiary-amino-2-arylalkanenitrile the mixture of 4-dimethylamino-2-phenylpentanenitrile and 4-dimethylamino-3-methyl-2-phenylbutanenitrile (the mixture being obtained by the condensation of 3-dimethylamino-2-propyl chloride and phenylacetonitrile according to directions given in Example I), a mixture of condensation products is obtained. For example, condensation of 190 g. (0.94 mole) of dimethylamino-2-phenylalkanenitrile (the above referred to mixture) and 185 g. (0.94 mole) of 4,7-dichloroquinoline using sodium amide, according to the general directions given above, yields 330 g. (0.91 mole) of viscous oil, from which three white crystalline solids are separated. The oil is warmed and poured slowly into 1.5 liters of rapidly stirred ether. After stirring for three hours, the light tan solid which separates is filtered off; yield is 115 g., M. P. 138–160° C. (fraction A). Trituration of the crude solid for twenty minutes with boiling petroleum ether (B. P. 60–68° C.) yields 46 g. of product, M. P. 165–169° C. Two recrystallizations from 600 ml. portions of absolute ethanol yields 32 g. of white rhombic plates, M. P. 182–183.8° C. (corr.), the structure of which is discussed below.

The ether filtrate, after the removal of fraction A, is treated with excess ethanolic hydrogen chloride and the ether decanted from the oil which separates. Two liters of acetone are added to the oil, and the mixture refluxed and triturated to give a yellow-orange solid which is collected by filtration (fraction B). The solid is dissolved in water, filtered with charcoal, and the free base liberated from the filtrate by means of sodium bicarbonate solution. The base is taken up in ether, the ether solution dried, filtered with charcoal, and evaporated. The remaining oil is dissolved in 200 ml. of benzene and allowed to stand for five hours. The solid that separates (35 g., M. P. 146–149° C.) is dissolved in 350 ml. of absolute ethanol and the solution filtered hot with charcoal. On cooling, 22 g. of white prismatic crystals separates; M. P. 151–152° C. (corr.). (A mixed melting point with a sample isolated from fraction A is 136–143° C.). The structure of this compound is discussed below.

The acetone filtrate, after the removal of fraction B, is evaporated, the resulting oil dissolved in water, the free base liberated with alkali solution and taken up in a large volume of ether. After drying of the ether solution, the ether is removed by distillation to give an oil which is slurried with a small volume of fresh ether to give 9 g. of a white solid, M. P. 135–140° C. (fraction C). The product is heated with 175 ml. of petroleum ether (B. P. 60–68° C.) and the mixture filtered while hot. On cooling, the filtrate yields 3 g. of pale yellow solid which is recrystallized, with charcoaling, from petroleum ether to give 2 g. of white prisms, M. P. 142–144° C., which has the same empirical formula as the compounds isolated from fractions A or B. A mixed melting point with either of these compounds isolated from fractions A or B is depressed.

Since the above three compounds isolated from fractions A, B, and C were prepared by condensing 4,7-dichloroquinoline with a mixture of 4-dimethylamino-2-phenylpentanenitrile (VI) and 4-dimethylamino-3-methyl-2-phenylbutanenitrile (VII), $(CH_3)_2NCHCH_2CHCN$
$\quad\quad\;\; |\quad\quad\;\;\; |$
$\quad\quad\; CH_3\quad\quad C_6H_5$
VI $(CH_3)_2NCH_2CHCHCN$
$\quad\quad\quad\;\; |\;\;\; |$
$\quad\quad\quad CH_3\; C_6H_5$
VII they have either Formula VIII or IX:

[Formula VIII: (CH_3)_2NCHCH_2—C(C_6H_5)(CN)— attached to 7-chloro-4-quinolyl, with CH_3 branch]

VIII

[Formula IX: (CH_3)_2NCH_2CH(CH_3)—C(C_6H_5)(CN)— attached to 7-chloro-4-quinolyl]

IX

Since each of the compounds represented by Formulas VIII and IX have two asymmetric carbon atoms, as designated by the asterisks, each can exist in two different stereoisomeric racemic mixtures. Of these four stereoisomers three are realized in the three compounds isolated from fractions A, B, and C of the above reaction mixture. The actual structure of each of these three compounds is not presently known, however, it seems possible that two of them are the stereoisomers of one of VIII and IX, the third having the structure of the other of VIII and IX.

III. *Tertiary-amino-2-aryl-2-(4-quinolyl) alkanamides*:

These basic amides are prepared by partially hydrolyzing the corresponding basic nitriles described in section II. The following general procedure gives excellent results:

A solution of one part by weight of a tertiary-amino-2-aryl-2-(4-quinolyl)alkanenitrile as described in section II in four volumes of concentrated sulfuric acid is allowed to stand at room temperature for four to five weeks. The yellow solution is poured onto ice, treated with an excess of sodium hydroxide solution, and extracted with chloroform. The extract is dried over anhydrous calcium sulfate, filtered with charcoal, and the chloroform removed by distillation to leave the crude amide in yields of 90% or better. Recrystallization from benzene or toluene yields, as a white crystalline solid, a tertiary-amino-2-aryl-2-(4-quinolyl)alkanamide.

The monohydrochlorides of these basic amides are prepared by a procedure similar to that used in the preparation of the corresponding salts of the basic nitriles. Larger volumes (5–20) of isopropanol are required to dissolve the amides. The salts are recrystallized from ethanol and dried at 140° C. in vacuo.

Some basic amides prepared in the above manner are those having the formula

[Structure: $(R')_2NCH_2CH_2$—C(C_6H_5)(CONH_2)— attached to R-substituted 4-quinolyl]

and having the melting points given in Table II:

Table II

| R | R' | Base M.P./°C. | Hydrochloride M.P./°C. |
|---|---|---|---|
| H | CH₃ | 173.8-175 (corr.) | 254-255 |
| 5-Cl | CH₃ | 203-204 [1] | 220-222 [1] (corr.) |
| 7-Cl | CH₃ | 190.8-191.8 (corr.) | 248-249 |
| H | C₂H₅ | 135-136 [2] | 247.5-248 [1] (corr.) |
| 5-Cl | C₂H₅ | 176.5-178-5 (corr.) | 225-226 |
| 7-Cl | C₂H₅ | 147.5-148.5 | 237.4-238.2 [1] (corr.) |

[1] With decomposition.
[2] Exists in a lower melting elevated form, M. P. 90-92° C., when recrystallized from benzene.

In addition, the following tertiary-amino-2-aryl-2-(4-quinolyl)-alkanamides are formed by partially hydrolyzing the corresponding basic nitriles: 4-diethylamino-2-(4-methoxyphenyl)-2-(6-methoxy-4-quinolyl)-butanamide, 5-diethylamino - 2 - (4 - chlorophenyl) - 2 - (6,8 - dichloro - 4 - quinolyl) - pentanamide, 4 - (4 - morpholinyl) - 2 - (3,4 - dichlorophenyl) - 2 - (3 - nitro - 4 - quinolyl) - butanamide, and 4 - (2 - methyl - 1 - piperidyl) - 2 - phenyl - 2 - (3 - methyl - 7 - iodo - 4 - quinolyl) butanamide.

The partial hydrolysis of the basic nitriles to the corresponding basic amides can be effected by other reaction conditions. For example, when 4 - diethylamino - 2 - phenyl - 2 - (7 - chloro - 4-quinolyl) butanenitrile is allowed to stand for only three days in concentrated sulfuric acid, the corresponding amide is obtained, but only in a 15% yield. Or, using other methods, equally low yields of this amide are obtained; for example, by refluxing the nitrile with an equal weight of sodium hydroxide in eight volumes of 70% ethanol for twelve hours or by heating 5 g. of the nitrile, 8 ml. of water and 8 ml. of concentrated sulfuric acid at reflux temperature for one hour.

IV. *Tertiary-amino-1-aryl-1-(4-quinolyl) alkanes*

These basic compounds are obtained from the corresponding basic nitriles as described in section II by complete hydrolysis of the nitrile group to the carboxyl group which spontaneously loses carbon dioxide. The following general procedure gives excellent results:

A solution of 30 g. of a tertiary-amino-2-aryl-2-(4-quinolyl)alkanenitrile in 50 ml. of water and 50 ml. of concentrated sulfuric acid is refluxed for 12 to 48 hours. The completeness of the reaction can be determined by passing nitrogen over the surface of the reaction mixture and bubbling the escaping gases through barium hydroxide solution. When no cloudiness results after a minute or so, the reaction is regarded as complete. The reaction mixture is poured onto ice containing an excess of sodium hydroxide solution, the liberated base extracted with ether, and the ether extract dried, filtered with charcoal and evaporated to give a pale yellow oil. In some instances a small amount of intermediate basic amide (described in Example III) is isolated even after a reflux period of 48 hours. This is removed by dissolving the oil in petroleum ether (B. P. 60-68° C.), seeding with the amide, and allowing the mixture to stand for 24 hours. Evaporation of the filtered solution yields the desired tertiary-amino-1-aryl - 1 - (4 - quinolyl) alkane, which can be converted into the hydrochloride without further purification or distilled in vacuo to give pale yellow tinted oils.

The monohydrochlorides are prepared by dissolving the free base in three volumes of isopropanol and adding slightly less than the equivalent amount of alcoholic hydrogen chloride. In order to induce crystallization, ether is added to turbidity, the inside of the flask scratched, and the solution allowed to stand. In some preparations several days pass before crystallization occurs.

Some basic compounds prepared in the above manner are those having the formula

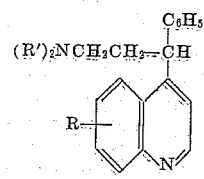

and having the physical constants given in Table III:

Table III

| R | R' | Base M.P. or B.P./°C. | $n_D^{25}$ | Hydrochloride, M.P./°C. |
|---|---|---|---|---|
| H | CH₃ | M. P. 90.2-91.6 (corr.) | | 155.5-156.5. |
| 5-Cl | CH₃ | B. P. 150 at 0.1 micron | 1.6200 | 200.6-201.4 (corr.) |
| 7-Cl | CH₃ | M. P. 77.8-79.2 (corr.) B. P. 154 at 0.1 micron | 1.6124 | |
| H | C₂H₅ | B. P. 190° at 0.5 mm. | 1.5942 | 176.4-177.4 (corr.) |
| 5-Cl | C₂H₅ | B. P. 209 at 0.8 mm. | 1.6052 | 183.4-184.4 (corr.) |
| 7-Cl | C₂H₅ | B. P. 155-6 at 0.1 micron | 1.5986 | 160.6-161.6 (corr.; taken fast) 196.6-197.5 (corr.; taken slowly) |

In addition, the following tertiary-amino-1-aryl-1-(4-quinolyl)alkanes are formed using the above general procedure of completely hydrolyzing the corresponding basic nitriles to the related carboxylic acids which spontaneously lose carbon dioxide: 3-diethylamino-1-(4-methoxyphenyl)-1-(6-methoxy - 4 - quinolyl) propane, 4-diethylamino - 1 - (4 - chlorophenyl) -1-(6,8-dichloro-4-quinolyl) butane, 3-(4-morpholinyl)-1-(3,4-dichlorophenyl) -1-(3-nitro - 4 - quinolyl)-propane, and 3-(2-methyl-1-piperidyl)-1-phenyl-1-(3-methyl-7-chloro-4-quinolyl) propane.

This application is a division of our copending application Serial Number 29,936, filed May 28, 1948, now U. S. Patent 2,570,286, issued October 9, 1951, which claims the tertiary-amino-2-aryl-2-(4-quinolyl) alkanenitriles illustrated in Example II hereinabove. The tertiary-amino-2-aryl-2-(4-quinolyl) alkanamides, which are illustrated in Example III above, are disclosed and claimed in our copending application Serial Number 196,521, filed November 18, 1950.

We claim:

1. A compound selected from the group consisting of basic compounds having the formula

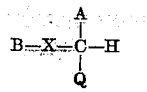

where B is a lower aliphatic tertiary-amino radical, X is a lower alkylene radical, A is an aryl radical of the benzene series, and Q is a 4-quinolyl radical, and acid addition salts thereof.

2. A compound selected from the group consisting of 3-dimethylamino-1-phenyl-1-(4-quinolyl)propane and acid addition salts thereof.

3. A compound selected from the group consisting of 3-dimethylamino-1-phenyl-1-(5-chloro-4-quinolyl)propane and acid addition salts thereof.

4. A compound selected from the group consisting of 3-dimethylamino-1-phenyl-1-(7-chloro-4-quinolyl)propane and acid addition salts thereof.

5. A compound selected from the group consisting of 3-diethylamino-1-phenyl-1-(5-chloro-4-quinolyl)propane and acid addition salts thereof.

6. A compound selected from the group consisting of 3-diethylamino-1-phenyl-1-(7-chloro-4-quinolyl)propane and acid addition salts thereof.

7. A process of preparing a compound having the formula

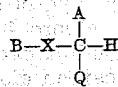

where B is a lower aliphatic tertiary-amino radical, X is a lower alkylene radical, A is an aryl radical of the benzene series and Q is a 4-quinolyl radical, which comprises reacting a 4-haloquinoline of the formula Q-halogen with a basic alpha-arylalkanenitrile of the formula

in the presence of a strong base to yield a basic alpha-aryl-alpha-(4-quinolyl)alkanenitrile of the formula

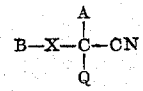

and subjecting said basic alpha-aryl-alpha-(4-quinolyl)alkanenitrile to vigorous treatment with strong mineral acid whereby said nitrile is hydrolyzed to the corresponding acid with simultaneous loss of carbon dioxide by refluxing it with aqueous sulfuric acid for about twelve to forty-eight hours.

8. A process for preparing a compound having the formula

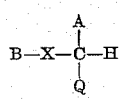

where B is a lower aliphatic tertiary-amino radical, X is a lower alkylene radical, A is an aryl radical of the benzene series and Q is a 4-quinolyl radical, which comprises completely hydrolyzing the related nitrile of the formula

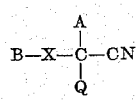

to the corresponding carboxylic acid with simultaneous loss of carbon dioxide by refluxing it with aqueous sulfuric acid for about twelve to forty-eight hours.

9. A process for preparing a compound having the formula

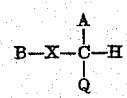

where B is a lower aliphatic tertiary-amino radical, X is a lower alkylene radical, A is an aryl radical of the benzene series and Q is a 4-quinolyl radical, which comprises hydrolyzing the related carboxamide of the formula

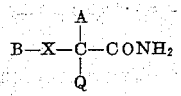

to the corresponding carboxylic acid with simultaneous loss of carbon dioxide by refluxing it with aqueous sulfuric acid for about twelve to forty-eight hours.

10. A compound having the formula

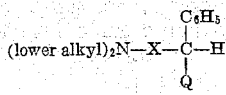

where X is a lower alkylene radical and Q is the 7-chloro-4-quinolyl radical.

11. A compound having the formula

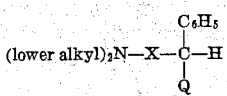

where X is a lower alkylene radical and Q is the 5-chloro-4-quinolyl radical.

12. A compound having the formula

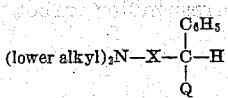

where X is a lower alkylene radical and Q is the 4-quinolyl radical.

13. A process for preparing a compound having the formula

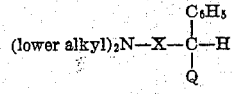

where X is a lower alkylene radical and Q is the 7-chloro-4-quinolyl radical, which comprises completely hydrolyzing the related nitrile of the formula

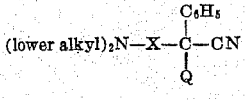

to the corresponding carboxylic acid with simultaneous loss of carbon dioxide by refluxing it with aqueous sulfuric acid for about twelve to forty-eight hours.

14. A process for preparing a compound having the formula

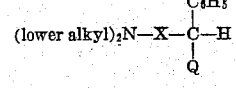

where X is a lower alkylene radical and Q is the 5-chloro-4-quinolyl radical, which comprises completely hydrolyzing the related nitrile of the formula

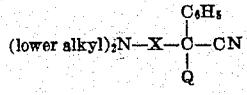

to the corresponding carboxylic acid with simultaneous loss of carbon dioxide by refluxing it with aqueous sulfuric acid for about twelve to forty-eight hours.

15. A process for preparing a compound having the formula

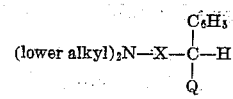

where X is a lower alkylene radical and Q is the 4-quinolyl radical, which comprises completely hydrolyzing the related nitrile of the formula

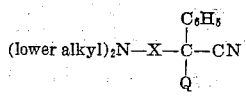

to the corresponding carboxylic acid with simultaneous loss of carbon dioxide by refluxing it with aqueous sulfuric acid for about twelve to forty-eight hours.

16. A process for preparing 3-dimethylamino-1-phenyl-1-(4-quinolyl)propane which comprises completely hydrolyzing 4-dimethylamino-2-phenyl-2-(4-quinolyl)butanenitrile to the corresponding carboxylic acid with simultaneous loss of carbon dioxide by refluxing it with aqueous sulfuric acid for about twelve to forty-eight hours.

17. A process for preparing 3-dimethylamino-1-phenyl-1-(5-chloro-4-quinolyl)propane which comprises completely hydrolyzing 4-dimethylamino-2-phenyl-2-(5-chloro-4-quinolyl)butanenitrile to the corresponding carboxylic acid with simultaneous loss of carbon dioxide by refluxing it with aqueous sulfuric acid for about twelve to forty-eight hours.

18. A process for preparing 3-dimethylamino-1-phenyl-1-(7-chloro-4-quinolyl)propane which comprises completely hydrolyzing 4-dimethylamino-2-phenyl-2-(7-chloro-4-quinolyl)butanenitrile to the corresponding carboxylic acid with simultaneous loss of carbon dioxide by refluxing it with aqueous sulfuric acid for about twelve to forty-eight hours.

19. A process for preparing 3-diethylamino-1-phenyl-1-(5-chloro-4-quinolyl)propane which comprises completely hydrolyzing 4-diethylamino-2-phenyl-2-(5-chloro-4-quinolyl)butanenitrile to the corresponding carboxylic acid with simultaneous loss of carbon dioxide by refluxing it with aqueous sulfuric acid for about twelve to forty-eight hours.

20. A process for preparing 3-diethylamino-1-phenyl-1-(7-chloro-4-quinolyl)propane which comprises completely hydrolyzing 4-diethylamino-2-phenyl-2-(7-chloro-4-quinolyl)butanenitrile to the corresponding carboxylic acid with simultaneous loss of carbon dioxide by refluxing it with aqueous sulfuric acid for about twelve to forty-eight hours.

ALEXANDER R. SURREY.
ROYAL A. CUTLER.

No references cited.